United States Patent
Song et al.

(10) Patent No.: US 10,521,798 B2
(45) Date of Patent: *Dec. 31, 2019

(54) DIGITAL FINANCIAL TRANSACTION SYSTEM

(71) Applicants: Yuh-shen Song, Porter Ranch, CA (US); Catherine Lew, Porter Ranch, CA (US); Alexander Song, Porter Ranch, CA (US); Victoria Song, Porter Ranch, CA (US)

(72) Inventors: Yuh-shen Song, Porter Ranch, CA (US); Catherine Lew, Porter Ranch, CA (US); Alexander Song, Porter Ranch, CA (US); Victoria Song, Porter Ranch, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 15/821,316

(22) Filed: Nov. 22, 2017

(65) Prior Publication Data
US 2018/0130058 A1 May 10, 2018

Related U.S. Application Data

(63) Continuation of application No. 15/176,046, filed on Jun. 7, 2016, now Pat. No. 9,858,576, which is a (Continued)

(51) Int. Cl.
*G06Q 20/40* (2012.01)
*G06F 21/33* (2013.01)
(Continued)

(52) U.S. Cl.
CPC .......... *G06Q 20/405* (2013.01); *G06F 21/33* (2013.01); *G06Q 20/02* (2013.01); *G06Q 20/10* (2013.01); *G06Q 20/108* (2013.01); *G06Q 20/38* (2013.01); *G06Q 20/382* (2013.01); *G06Q 20/385* (2013.01); *G06Q 20/3821* (2013.01);
(Continued)

(58) Field of Classification Search
None
See application file for complete search history.

(56) References Cited

U.S. PATENT DOCUMENTS

| 6,286,756 B1 | 9/2001 | Stinson et al. |
| 6,341,724 B2 | 1/2002 | Campisano |

(Continued)

FOREIGN PATENT DOCUMENTS

| CN | 1567320 A | 1/2005 |
| CN | 1835008 A | 9/2006 |

(Continued)

*Primary Examiner* — Andrae S Allison
(74) *Attorney, Agent, or Firm* — Seyfarth Shaw LLP

(57) ABSTRACT

A method for conducting financial transactions includes storing a first set of data comprising a portion of a user's identification information. An identity of a user is unidentifiable from the portion of the user's identification information. The method also includes receiving a second set of data and sending a new pass code to a first computer system when the first set of data matches the second set of data. The method approves a transaction associated with the user in response to receiving the new pass code from a second computer system.

20 Claims, 11 Drawing Sheets

Related U.S. Application Data continuation of application No. 14/105,020, filed on Dec. 12, 2013, now Pat. No. 9,390,417, which is a continuation of application No. 12/726,218, filed on Mar. 17, 2010, now Pat. No. 8,625,838.

(60) Provisional application No. 61/211,335, filed on Mar. 30, 2009.

(51) Int. Cl.
*G06Q 20/02* (2012.01)
*G06Q 20/10* (2012.01)
*G06Q 20/38* (2012.01)
*G06Q 30/02* (2012.01)
*G06Q 50/26* (2012.01)
*G06Q 40/00* (2012.01)
*H04L 29/06* (2006.01)

(52) U.S. Cl.
CPC .......... *G06Q 20/40* (2013.01); *G06Q 20/401* (2013.01); *G06Q 20/4012* (2013.01); *G06Q 20/4014* (2013.01); *G06Q 20/4016* (2013.01); *G06Q 20/40145* (2013.01); *G06Q 30/0248* (2013.01); *G06Q 40/12* (2013.12); *G06Q 50/265* (2013.01); *H04L 63/101* (2013.01); *H04L 63/102* (2013.01)

(56) References Cited

U.S. PATENT DOCUMENTS

| | | | |
|---|---|---|---|
| 7,197,640 B2 | 3/2007 | Meisel | |
| 7,686,214 B1 | 3/2010 | Shao et al. | |
| 7,774,270 B1 | 8/2010 | Maccloskey | |
| 7,865,428 B2* | 1/2011 | Pegaz-Paquet | G06Q 20/04 |
| | | | 705/26.25 |
| 7,890,425 B2 | 2/2011 | Stanley | |
| 8,276,814 B1 | 10/2012 | Davis | |
| 2002/0099649 A1 | 7/2002 | Lee et al. | |
| 2003/0033533 A1* | 2/2003 | Meisel | H04L 63/0823 |
| | | | 713/185 |
| 2003/0061167 A1* | 3/2003 | Mann, III | G06Q 20/04 |
| | | | 705/64 |
| 2003/0158785 A1 | 8/2003 | Erca | |
| 2005/0033684 A1* | 2/2005 | Benedyk | G06Q 20/04 |
| | | | 705/39 |
| 2005/0086164 A1* | 4/2005 | Kim | G06Q 20/102 |
| | | | 705/40 |
| 2005/0222917 A1* | 10/2005 | Moore | G06Q 30/0641 |
| | | | 705/27.1 |
| 2005/0243984 A1 | 11/2005 | Mahone et al. | |
| 2006/0080545 A1 | 4/2006 | Bagley | |
| 2006/0161435 A1* | 7/2006 | Atef | G06F 21/31 |
| | | | 704/246 |
| 2007/0043577 A1 | 2/2007 | Kasower | |
| 2007/0063017 A1 | 3/2007 | Chen et al. | |
| 2007/0083463 A1 | 4/2007 | Kraft | |
| 2007/0083771 A1* | 4/2007 | Chen | G06F 21/62 |
| | | | 713/193 |
| 2007/0136573 A1 | 6/2007 | Steinberg | |
| 2008/0040285 A1* | 2/2008 | Wankmueller | G06Q 20/32 |
| | | | 705/67 |
| 2008/0103800 A1 | 5/2008 | Domenikos et al. | |
| 2008/0288351 A1* | 11/2008 | Leung | G06Q 20/20 |
| | | | 705/14.26 |
| 2010/0017413 A1 | 1/2010 | James | |
| 2010/0250410 A1 | 9/2010 | Song et al. | |
| 2011/0131132 A1 | 6/2011 | Friman | |
| 2011/0231316 A1 | 9/2011 | Carroll, III | |
| 2011/0295750 A1 | 12/2011 | Rammal | |
| 2011/0320347 A1 | 12/2011 | Tumminaro et al. | |

FOREIGN PATENT DOCUMENTS

| | | |
|---|---|---|
| CN | 101017583 A | 8/2007 |
| JP | 2006-313474 A | 11/2006 |
| KR | 20-2000-0002814 A | 2/2000 |
| KR | 10-2002-0065989 A | 8/2002 |
| KR | 10-2002-0088023 A1 | 11/2002 |
| KR | 10-2003-0014871 A | 2/2003 |
| KR | 10-2005-0009336 A1 | 1/2005 |
| WO | 2006-000021 A1 | 1/2006 |

\* cited by examiner

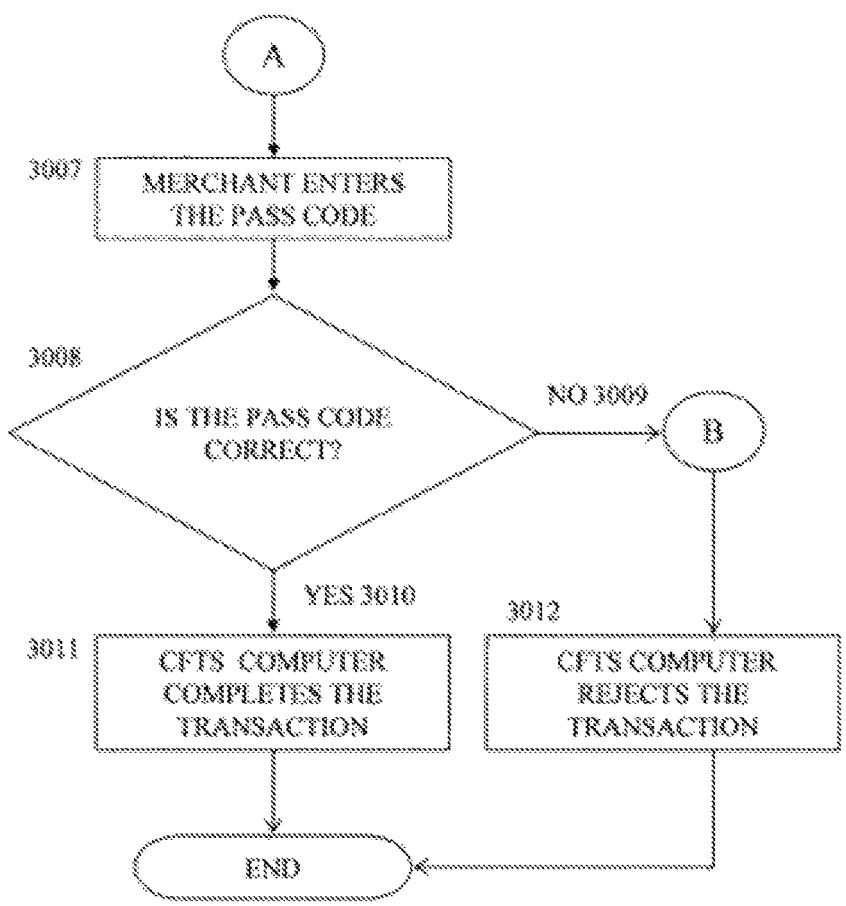

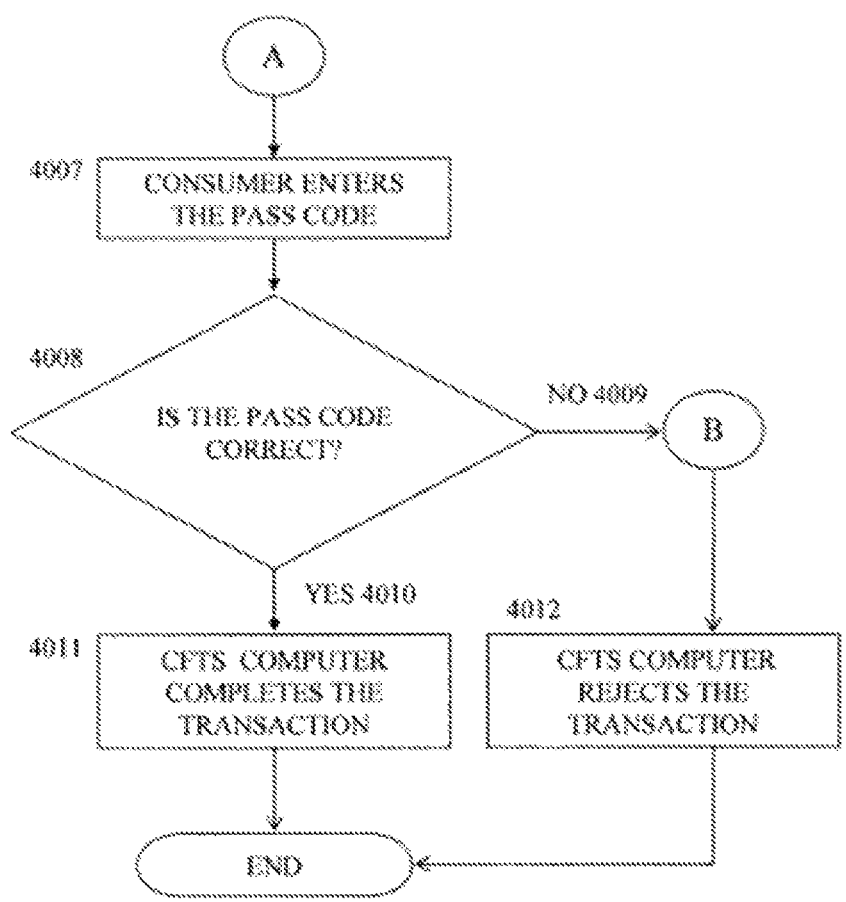

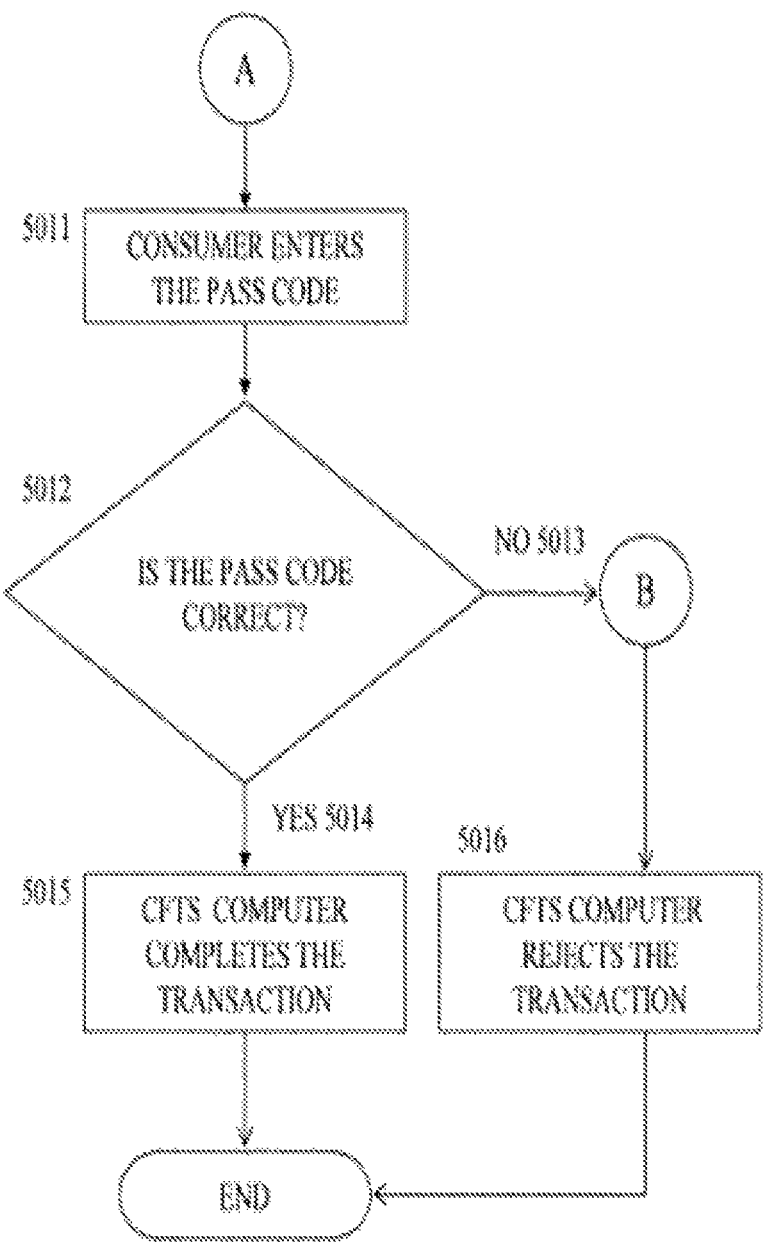

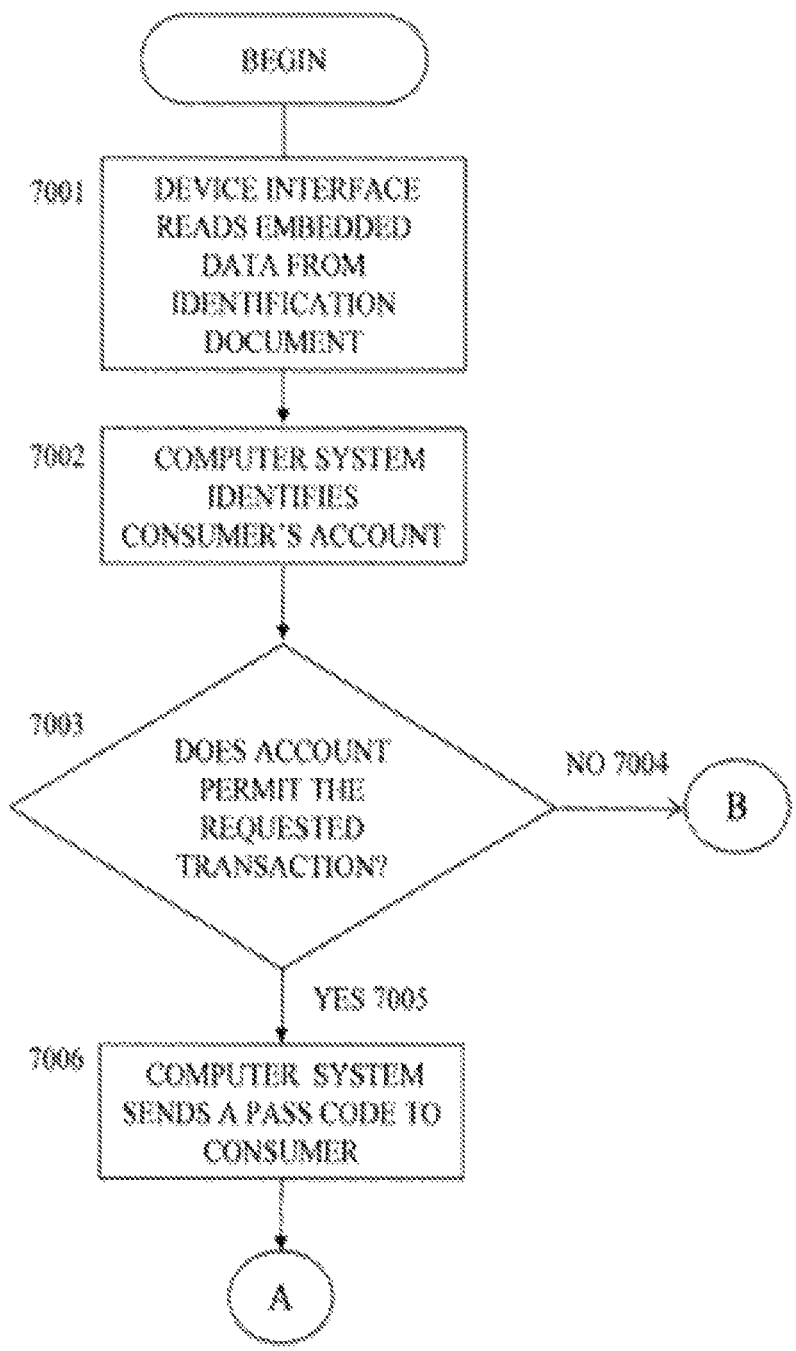

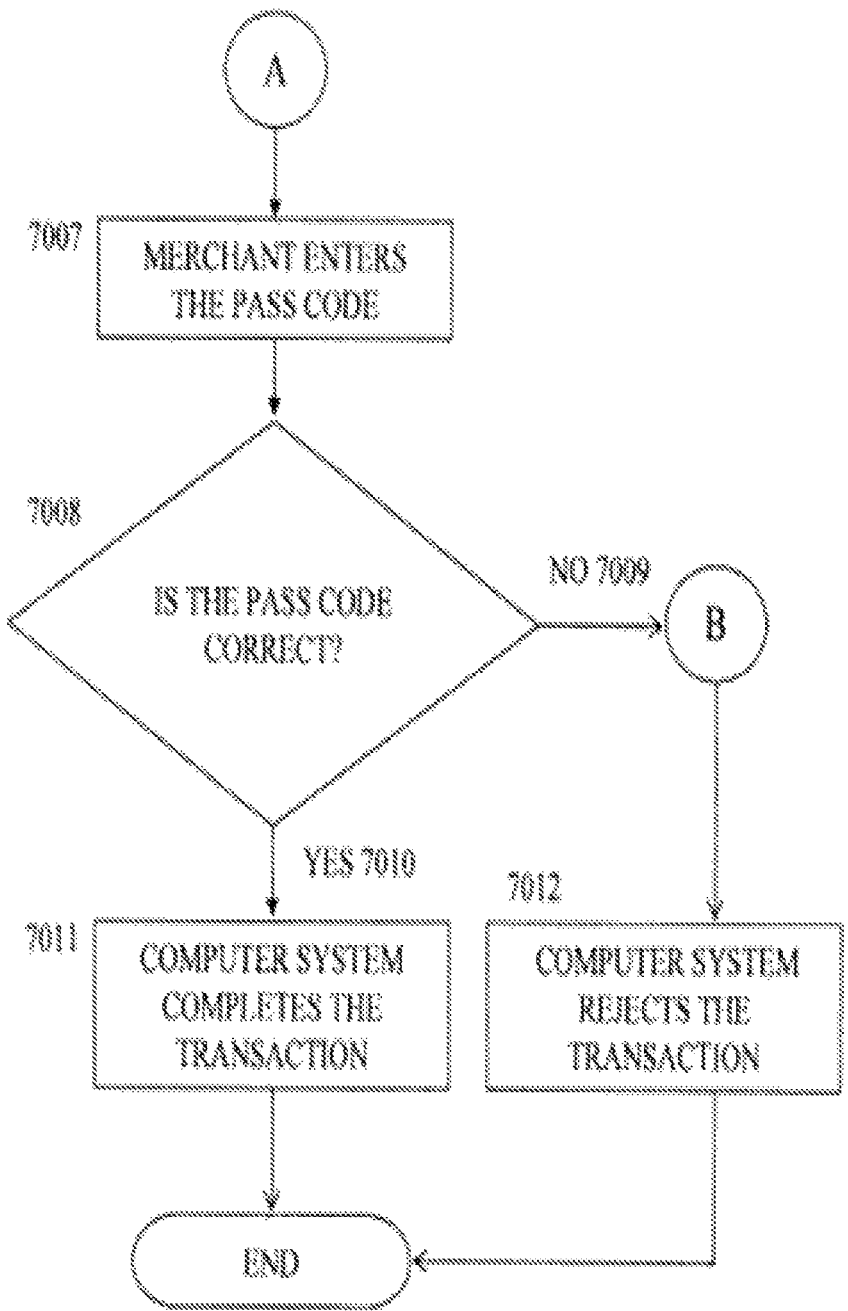

DIGITAL FINANCIAL TRANSACTION SYSTEM

CROSS REFERENCE TO RELATED APPLICATIONS

This application is a continuation of U.S. patent application Ser. No. 15/176,046, filed on Jun. 7, 2016, which is a continuation of U.S. patent application Ser. No. 14/105,020, filed on Dec. 12, 2013, now U.S. Pat. No. 9,390,417, which is a continuation of U.S. patent application Ser. No. 12/726,218, filed on Mar. 17, 2010, now U.S. Pat. No. 8,625,838, which claims the benefit of U.S. Provisional Patent Application No. 61/211,335, filed on Mar. 30, 2009, the disclosures of which are expressly incorporated by reference herein in their entireties.

TECHNICAL FIELD

The present disclosure relates generally to financial transactions system. More specifically, the present disclosure relates to conducting financial transactions without using any traditional financial instruments such as a credit card, debit card, ATM card, gift card, stored value card, prepaid card, cash, check, etc.

BACKGROUND

Traditional payment cards such as credit cards, debit cards, ATM cards, stored-value cards, gift cards, prepaid cards, etc. can be easily stolen and fabricated. For example, by bribing a waiter in a restaurant, a fraudster can easily steal the card information from a guest of the restaurant. The fraudster can use the stolen card information to pay a nominal fee to numerous background search websites on the Internet to find useful personal information based on the cardholder's name shown on the stolen card. A counterfeit card and a counterfeit identification document, such as a driver's license, can be easily fabricated with present technology.

Once a fraudster has stolen or fabricated such card, the fraudster can quickly conduct many illegal financial transactions before the affected financial institutions, organizations or individuals identify the fraud and disable the card. Many individuals, organizations and financial institutions have suffered tremendous material loss and damages as a result of fraud in financial transactions.

In fact, stealing financial instruments is easily committed today. Many financial institutions and merchants keep the personal information (e.g., the information of the financial instruments such as credit cards, debit cards, etc.) of their clients in their databases. It is common for employees of financial institutions, merchants, or consumer report companies to steal customers' information, commit fraud, and/or sell the information to fraudsters.

In addition to credit cards, debit cards, etc., checks remain one of the most popular financial instruments today. It is easier to fabricate a counterfeit check than to fabricate a counterfeit card. There are numerous cases related to counterfeit checks that are used together with counterfeit identification documents.

Furthermore, an online merchant cannot easily tell whether a remote consumer has the correct identity. If correct card information, which can be obtained from a stolen card, and the correct billing address, which can be obtained from Internet search websites, are presented, the merchant cannot easily tell whether the remote consumer is actually a fraudster. An experienced fraudster can easily conduct fraudulent online transactions. As a result, online merchants lose a tremendous amount of money every year.

Furthermore, mailing new financial instruments to new customers or existing customers when their old financial instruments expire is a major overhead to financial institutions. In addition to the huge amount of resources used in this mailing process, these financial instruments can be easily stolen during the mailing process and become susceptible to fraud.

In addition to these examples, fraud is easily committed in the computer age because a user is often identified by a user ID and/or Personal Identification Number ("PIN") and a password. Once a fraudster has stolen the user ID and/or PIN and password of another person, that fraudster can conduct many criminal activities through access to this account. Therefore, fraud is a major threat to online banking, online trading, e-commerce, and many other computer related activities.

In summary, financial transactions fraud can be easily committed today, and individuals, organizations, merchants and financial institutions are suffering enormous losses and damages. There is a need for a better financial transactions system.

SUMMARY

One aspect of the present disclosure enables consumers to conduct financial transactions in a secured manner without the need to use any traditional financial instrument which can be easily stolen or fabricated.

As a result of one aspect of the present disclosure, there is no need for consumers to carry traditional financial instruments such as checks, credit cards, debit cards, stored-value cards, pre-paid cards, ATM cards, gift cards, etc.

Traditionally, a client of a financial institution is identified by an account number. For example, a credit card has a credit card account number. A check has a checking account number. A stock trading account has a trading account number. An insurance policy holder has a policy number (or an account number). This is the traditional way for financial institutions to identify and manage billions of clients without any confusion.

Because an account number is very long and a client may not be able to remember it, it is customary for a financial institution to issue a financial instrument that contains the account number. Therefore, financial transactions are conducted conventionally through cards.

Nevertheless, if the financial instrument information of a consumer is stolen, a fraudster can use the stolen information to fabricate counterfeit financial instruments such as credit cards, debit cards, or checks, etc. or to give fraudulent instructions. Therefore, protecting the financial instruments is essential to preventing financial transactions fraud.

Many methods have been disclosed throughout history to protect financial instruments. For example, some methods suggest that financial institutions provide consumers with temporary card numbers that automatically expire when certain criteria is met. Some methods suggest that cardholders deactivate their card numbers while they are not using the cards and activate their card numbers again before they use their cards. In general, these methods create huge overhead to financial institutions and consumers.

One aspect of the present disclosure reduces or eliminates the dependence on the traditional financial instruments such as checks, credit cards, debit cards, ATM cards, pre-paid cards, stored value cards, gift cards, monetary instruments, wire transfers, etc. so that there is nothing for fraudsters to steal.

In one aspect of the present disclosure, a computer system to conduct financial transactions without using traditional financial instruments includes a computer processor and a memory device coupled to a network. A database stored on the memory device is operable to store associated with a user's account at least two sets of data and contact information of a personal communication device of the user. The first set of data consists of a part of the user's personal identification information which the user knows well without any special effort to memorize. The second set of data is a short data string which the user can memorize with minimum effort. The second set of data ensures the uniqueness of the combination of the first set of data and the second set of data in the database.

The computer system uses a communication module to send a new pass code in substantially real-time to the user's personal communication device in response to receiving the first set of data and the second set of data from a subject and the user's account complying with a pre-defined condition. The pass code has a pre-defined life time. In addition, the computer system uses a transaction processing module which permits the subject to conduct at least one transaction in response to receiving the pass code from the subject before the pass code expires.

In another aspect of the present disclosure, a computer system to conduct financial transactions without using traditional financial instruments includes a computer processor and a memory device coupled to a network and a database stored on the memory device adapted to store associated with a user's account at least the identification document information of a government-issued official identification document of the user and contact information of a personal communication device of the user.

The computer system uses a communication module to send a new pass code in substantially real-time to the user's personal communication device in response to receiving the identification document information which is provided by a subject and read by a device interface and the user's account complying with a pre-defined condition. The pass code has a pre-defined life time. In addition, the computer system uses a transaction processing module which permits the subject to conduct at least one transaction in response to receiving the pass code from the subject before the pass code expires.

In an alternative aspect of the present disclosure, a computer system to conduct financial transactions without using traditional financial instruments includes a computer processor and a memory device coupled to a network and a database stored on the memory device adapted to store associated with a user's account at least account identification information and contact information of a personal communication device of the user.

The computer system uses a communication module to send the user's account identification information to the user's personal communication device. The communication module sends a new pass code in substantially real-time to the user's personal communication device in response to receiving the account identification information read by a device interface from a personal communication device provided by a subject and the user's account complying with a pre-defined condition. The device interface is connected to the computer through a network. The pass code has a pre-defined life time. In addition, the computer system uses a transaction processing module which permits the subject to conduct at least one transaction in response to receiving the pass code from the subject before the pass code expires.

Furthermore, in one aspect of the present disclosure, a computerized method to protect login security includes (1) storing associated with a user's account at least account identification information and contact information of a personal communication device of the user; (2) sending a new pass code in substantially real-time to the user's personal communication device in response to receiving the account identification information entered by a subject with an attempt to login when the pass code has been given a pre-defined life time; and (3) permitting the subject to login in response to receiving the pass code from the subject before the pass code expires.

Moreover, in one aspect of the present disclosure, a computerized method to open a financial account for a remote subject includes (1) receiving personal identification information from the subject. The personal identification information is read by a device interface from a government-issued official identification document; (2) receiving biometric information from the subject. The biometric information is read by the device interface from the subject; and (3) opening the account based on the subject's identification information when the biometric information read from the subject corresponds to the personal identification information read from the official identification document and the subject is not on a blacklist.

In this disclosure, the terminology "network" or "networks" generally refers to a communication network or networks, which can be wireless or wired, private or public, real time or non-real time, or a combination of them, and includes the well-known Internet.

In this disclosure, the terminology "computer" or "computer system" generally refers to either one computer or a group of computers, which may work alone or work together to reach the purposes of the system.

In this disclosure, the terminology "processor" generally refers to either one processor or a group of processors, which may work alone or work together to accomplish the purposes of the computer system.

In this disclosure, a "bank" or "financial institution" generally refers to a financial service provider, either a bank or a non-bank, where financial services are provided.

In this disclosure, a "bank account" or "financial account" generally refers to an account associated with a financial institution, either a bank or a non-bank, where financial transactions can be conducted through financial instruments such as cash, checks, credit cards, debit cards, ATM cards, stored value cards, gift cards, pre-paid cards, wires, monetary instruments, letters of credit, notes, securities, commercial papers, commodities, precious metal, electronic fund transfers, automatic clearing house, etc.

In this disclosure, "financial transactions" generally refer to transactions related to financial activities, including but not limited to payment, fund transfer, money services, payroll, invoicing, trading, escrow, insurance, underwriting, merger, acquisition, account opening, account closing, etc.

In this disclosure, "trading" generally refers to trading activities, both private and public, including but not limited to trading of stock, currency, commodities, rights, values, securities, derivatives, goods, services, merchandise, etc.

In this disclosure, "securities" are generally referred to according to the definition in the Securities Act of 1933. For example, securities may generally include note, stock certificate, bond, debenture, check, draft, warrant, traveler's check, letter of credit, warehouse receipt, negotiable bill of lading, evidence of indebtedness, certificate of interest or participation in any profit-sharing agreement, collateral-trust certificate, preorganization certificate or subscription, transferable share, investment contract, voting-trust certificate; valid or blank motor vehicle title; certificate of interest in property, tangible or intangible; instrument or document or writing evidencing ownership of goods, wares, and merchandise, or transferring or assigning any right, title, or interest in or to goods, wares, and merchandise; or, in general, any instrument commonly known as a "security", or any certificate of interest or participation in, temporary or interim certificate for, receipt for, warrant, or right to subscribe to or purchase any of the foregoing.

In this disclosure, a "consumer" generally refers to a customer, person, subject, subject person, payer, user, or client, etc., seeking to perform a transaction with an individual, an organization, a merchant, and/or a financial institution.

In this document, the terminology "official identification document" generally refers to a passport, driver's license, voter card, benefits card, student identification card, social security card, national identification card, identity card, certificate of legal status, and other official documents and information bearing instruments that identify a designated individual by certain verifiable characteristics, that are issued or certified by a consulate, embassy, government agency, or other governmental authorities, and that are protected against unauthorized copying or alteration by the responsible government. In particular, such "official identification documents" can be formed from various materials, including paper, plastic, polycarbonate, PVC, ABS, PET, Teslin, composites, etc. and can embed the identification information in various formats, including printed or embossed on the document (or card), written on a magnetic medium, programmed into an electronic device, stored in a memory, and combinations thereof. The "identification information" may include, but is not necessarily limited to, names, identification numbers, date of birth, signatures, addresses, passwords, phone numbers, email addresses, personal identification numbers, tax identification numbers, national identification numbers, countries that issue the IDs, states that issue the IDs, ID expiration date, photographs, fingerprints, iris scans, physical descriptions, and other biometric information. The embedded information can be read through optical, acoustic, electronic, magnetic, electro-magnetic and other media.

In this disclosure, "personal identification information" generally refers to name, address, date of birth, personal identification number, user ID, password, tax identification number, type of the identification document used, identity number associated with the identification document, country, state, government organization and/or a private organization issuing the identification document, expiration date of the identification document, phone number, screen name, e-mail address, photographs, fingerprints, iris scans, physical descriptions, and other biometrical information.

In this disclosure, "personal information" includes at least personal identification information, personal relationships, personal status, personal background, personal interests, and personal financial information including information related to financial instruments, financial accounts and financial activities.

In this disclosure, "financial instruments" generally refer to instruments which are used to conduct financial transactions. Examples of financial instruments include cash, credit cards, debit cards, ATM cards, prepaid cards, stored value cards, gift cards, checks, monetary instruments, wire transfers, letters of credit, notes, securities, commercial papers, commodities, gold, silver, etc.

In this disclosure, a "personal communication device" generally refers to a device interface used for personal communication purposes.

In this disclosure, a "device interface" generally refers to a keyboard, a keypad, a monitor, a display, a terminal, a computer, a control panel, a vehicle dash board, a network interface, a machinery interface, a video interface, an audio interface, an electrical interface, an electronic interface, a magnetic interface, an electromagnetic interface including electromagnetic wave interface, an optical interface, a light interface, an acoustic interface, a video interface, an audio interface, a contactless interface, a mobile phone interface, a smartphone interface, a Smartbook interface, other communication device interface, a Personal Digital Assistant (PDA) interface, a handheld device interface, a portable device interface, a wireless interface, a wired interface, and other interfaces.

In this document, the terminology "terminal" or "kiosk" generally refers to equipment, including a computer and/or its peripherals, microprocessor and/or its peripherals, ATM terminal, check-cashing kiosk, money services kiosk, merchant checkout stand, cash register, coin exchange machine, parking lot payment kiosk, other payment kiosks, contactless device, wire line phone, mobile phone, smartphone, Smartbook, personal communication device, PDA, digital assistant, entertainment device, network interface device, router, and/or Personal Digital Assistant (PDA), etc., which interfaces a user with a computer network, so that the user may interact with computer systems and other equipment connected to the computer network.

For a further understanding of the nature and advantages of the disclosure, reference should be made to the following description taken in conjunction with the accompanying drawings.

BRIEF DESCRIPTION OF THE FIGURES

FIG. 3A and FIG. 3B are flowcharts of an example process, indicating how the system shown in FIG. 1 enables a consumer to conduct secured financial transaction with a retail store at point of sale or with a remote merchant through a phone call.

FIG. 4A and FIG. 4B are flowcharts of an example process, indicating how the system shown in FIG. 1 enables a consumer to conduct secured financial transactions with a retail store through an automatic checkout stand or with an online merchant through a computer user interface. These flowcharts also show how a consumer can conduct financial transactions through an ATM, kiosk, or other types of device interface.

FIG. 5A and FIG. 5B are flowcharts of an example process, indicating how the system shown in FIG. 1 enables a consumer to conduct secured financial transaction with a retail store through his/her personal communication device such as a mobile phone.

FIG. 7A and FIG. 7B are flowcharts of an example process, indicating how the system shown in FIG. 1 enables a consumer to conduct secured financial transactions with a retail store through his/her official identification document such as a driver's license. These flowcharts also show how a consumer can conduct financial transactions through an ATM, kiosk, or other types of device interface.

DETAILED DESCRIPTION

Figure 1:
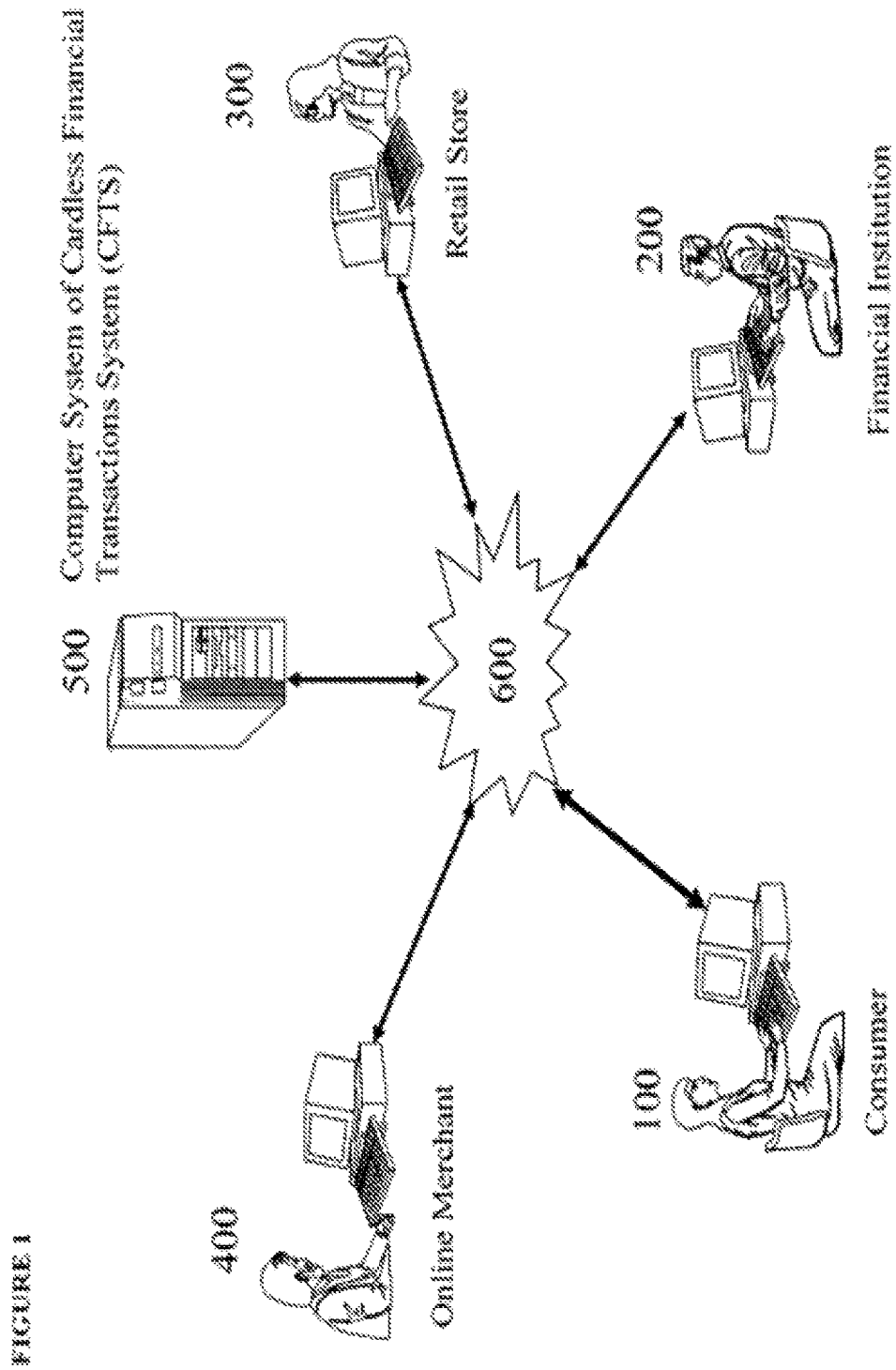
FIG. 1 illustrates a system and network diagram of a Cardless Financial Transactions System ("CFTS") to enable consumers, financial institutions and merchants to conduct secured financial transactions.

Because financial instruments such as credit cards, etc. can be easily stolen or fabricated, one aspect of the present disclosure eliminates the use of traditional financial instruments. Traditional financial instruments provide an important function of linking a consumer to his/her accounts in financial institutions. Therefore, this linking function is provided in a different manner if the traditional financial instruments are eliminated.

In one aspect of the present disclosure, a consumer can use his/her official identification document to link the consumer to his/her financial account.

In another aspect of the present disclosure, a consumer's account identification information is sent to a personal communication device of the consumer, e.g., smartphone, etc. Such account identification information can be transformed into a graphical pattern (e.g., a bar code) which can be displayed on the personal communication device for easy scanning by optical devices. This graphical pattern will link the consumer to his/her financial account. In addition, a consumer can request a change to new account identification from time to time and a new graphical pattern will be sent to the user to make it difficult for fraudster to steal the graphical pattern of the user.

In an alternative aspect of the present disclosure, the consumer's account identification information can be sent to a personal communication device of the consumer and such account identification information can be transformed into acoustic, electronic, electro-magnetic or magnetic signals so that the account identification information of the consumer can be easily read by a device interface. In addition, a consumer can request a change to new account identification from time to time to make it difficult for a fraudster to steal the account identification information of the consumer.

Because the new account identification information can be instantly sent to the personal communication device of the consumer, there is no need to worry about shipping, handling and associated fraud which would occur if a traditional financial instrument were used.

Furthermore, in one aspect of the present disclosure, a password or pass code can be used to protect the personal communication device so that a fraudster who has stolen a consumer's personal communication device cannot use that personal communication device without the correct password or pass code.

In yet another alternative aspect of the present disclosure, a consumer remembers a number (including an alpha-numerical number) or a data string which can be linked to his/her account. In addition, each consumer can change this number or data string from time to time to make it difficult for a fraudster to know or use this number or data string.

There are about six billion persons on earth and each one must be uniquely identified to avoid confusion in financial transactions. In addition, each financial institution has to be uniquely identified. That is the reason why a credit card number or a debit card number usually has a length of about 15 to 20 digits.

To many people, it is difficult to remember a number of 15 digits to 20 digits or a data string of equivalent length. In fact, most people only feel comfortable to remember a number up to six or seven digits. On the other hand, a number of six or seven digits can only uniquely identify 1 million or 10 million accounts and is insufficient to cover the entire population on earth for account identification purposes.

Furthermore, the official identification document, the account identification information and the consumer-memorized number or data string aforementioned can still be stolen by fraudsters. Although no traditional financial instrument is used to link a consumer to his/her financial account, the above approaches are still susceptible to fraud.

In one aspect of the present disclosure, a computer network with device interfaces and a central computer system having memory, a database, and peripherals, collectively referred to as a Cardless Financial Transactions System (CFTS) in this disclosure, connects consumers, organizations, merchants, financial institutions, etc. through the device interfaces. The central computer system is used to manage all the consumers, organizations, merchants, financial institutions, accounts, financial activities, etc. on the network in a secured manner.

For illustration purposes, payment transactions are often used as examples in the present disclosure. However, the present disclosure can be applied to other types of financial transactions in addition to payment transactions.

In one aspect of the present disclosure, a person logs into the CFTS computer through a device interface and opens an account with the computer system of the CFTS and provides the CFTS with the person's personal information, including personal identification information.

In another aspect of the present disclosure, the embedded information of an official identification document is read by a device interface to provide the personal identification information. Because the official identification document is protected by the respective government, reading the embedded information directly from the official identification document can effectively prevent fraud.

To make sure that the person is the true owner of the official identification document, the embedded information of the official identification document can be used to authenticate the identity of the person. For example, if the biometrical information of the person, such as fingerprint, iris patterns, photo, etc., corresponds to the biometrical information embedded within or on the official identification document, the person must be the true owner of the official identification document.

Alternatively, if a person can accurately provide some private information, such as personal identification number, which is embedded inside the official identification document, this person is very likely the true owner of the official identification. This authentication approach is much more accurate than the traditional approach which depends on human comparison between the appearance of the person and the photo on the official identification document. Furthermore, because this authentication approach eliminates the need for human involvement, a consumer can open an account at a terminal, kiosk, etc.

The CFTS computer processes the personal information submitted by the person and approves the account opening for the person in compliance with regulations and laws.

Once an account is opened, a person can be identified by a set of partial personal identification information.

For example, a consumer can be identified by a combination of the zip code of the address shown on the consumer's identification document, the year of birth, the last four digits of the ID number, the first two letters of the first name, the first two letters of the last name shown on the ID, the country/state of issuance of the ID, the expiration date of the ID, etc. Because only a set of partial data of the consumer's personal identification information is used, the true identity of the consumer is not disclosed. Furthermore, there is no way to recover the personal identification information of the consumer from or through this set of partial data.

Although only a set of partial data of the consumer's personal identification information is used, the probability of a mismatch when two persons having the same set of partial data can be substantially reduced to zero if a sufficient amount of partial data is used. In the current example, the probability for a mismatch is in the magnitude of about 1 out of $10^{22}$. The number $10^{22}$ is derived from the approximation of $10^5$ (5 digit zip code)$\times 10^2$ (year of birth based on two digits of a 100-year life span)$\times 10^4$ (4 digits of ID number)$\times 26^2$ (2 letters of first name)$\times 26^2$ (2 letters of last name)$\times 200$ (estimated number of participating countries)$\times 365 \times 4$ (a 4-year effective period for the ID).

Even if two consumers have the same set of partial data, such confusion can be easily resolved by other methods. For example, the computer system of CFTS can assign an additional number with a very short length, such as six digits, to distinguish among the persons who happen to have the same set of partial personal identification information.

Because there are only about 6 billion persons on earth (i.e., $6 \times 10^9$), the total number of persons who may have the same set of partial personal identification data is a very small number if a sufficient amount of partial personal identification data is used. As a result, a number of a few digits will be more than sufficient to identify the entire population on earth when a set of partial personal identification data is also used for identification purposes. In fact, it is possible that even 2 or 3 digits will be sufficient.

Because only a few digits are assigned by the computer system of the CFTS, a consumer only needs to remember this short number of a few digits because the consumer should know his/her own personal identification information.

For the purpose of this disclosure, this short number is referred to as Account Identification Number (AIN). As a result, the equivalent account identification (which is equivalent to the traditional account number) of the CFTS can be a combination of the AIN and a set of personal identification data. For example, a possible account identification of the CFTS can be composed of the 5-digit zip code of the consumer, the last 4 digits of the consumer's phone number, and a 6-digit AIN. In general, a consumer remembers his/her zip code and phone number. As a result, a consumer only needs to remember his/her short AIN.

In one aspect of the present disclosure, the AIN is assigned by the CFTS computer. To further reduce the need for consumers to memorize numbers, in another aspect of the present disclosure, a consumer can suggest his/her own preferred AIN and the CFTS computer can approve the particular AIN if no other person in the CFTS database, whose set of partial personal identification data is identical to the consumer's, has used the suggested AIN yet.

If zip code is not used in a particular country or area, a possible account number of the CFTS can be composed of, for example, the last 5 digits of the official identification document number of the consumer, the last 4 digits of the consumer's primary phone number, and a 6-digit AIN assigned by the CFTS computer. In fact, many other different sets of partial personal identification information can be used to achieve the same goal.

Because only partial personal identification information is used, the identity of the consumer cannot be recovered from a set of partial personal identification information and the privacy of the consumer is fully protected.

In an alternative aspect of the present disclosure, if privacy is not a concern, the personal phone number of a person and the country code and the area code of the person can uniquely identify a person.

In one aspect of the present disclosure, this short AIN also contains one or two control digits to further strengthen the security of the account number of CFTS. For example, a control digit can be derived by taking the last digit from the sum of all other digits of the CFTS account identification. Another example is that a control digit is obtained by taking the last digit of the sum of the square of each of the other digits of the CFTS account identification.

As a result of these control digits, not all numbers can be used for account identification in the CFTS database. These control digits can effectively reduce the chance that a fraudster can randomly pick a number and use it as the CFTS account identification.

The above approach of using partial personal identification information to identify an account can also be used by an automatic checkout stand, an ATM terminal, a kiosk, or other types of device interfaces.

In the event that a consumer cannot remember this short AIN of a few digits, in one aspect of the present disclosure, a consumer can use his/her identification document to conduct financial transactions. The information on the identification document can be entered by the consumer, the merchant, or the financial institution. It is preferable to use the "official" identification documents for this purpose because official identification documents are protected by the respective government organizations which issued the official identification documents.

In another aspect of the present invention, a device interface, such as a terminal, can read the information embedded within or on the identification document. As a result, a consumer can pay goods or services with his/her identification document at an automatic checkout stand.

In one aspect of the present disclosure, there is no need to send all the information of the identification document to the CFTS computer. To protect the consumer's personal identification information which can be stolen during the data transmission, a set of partial data of the personal identification information can be used for identification purposes. For example, the 5-digit zip code, the last 6 digits of the identification document number and the initial of the last name can be used for identification purposes. In this example, the chance for a mismatch is one out of 2.6 trillion (i.e., $26 \times 10^5 \times 10^6$).

In another aspect of the present disclosure, a Personal Identification Number (PIN) can be used with dual purposes (1) to eliminate the chance of mismatch and (2) to enhance the security.

In one aspect of the present disclosure, the PIN can be assigned by the CFTS computer. In another aspect of the present disclosure, the PIN can be suggested by the consumer and will become effective after the approval by the computer of the CFTS.

In yet another aspect of the present disclosure, a PIN can be composed of some digits suggested by the consumer and some digits assigned by the CFTS computer. In an alternative aspect of the present invention, an AIN or a part of the MN can also be used as the PIN. In yet another alternative aspect of the present invention, a PIN or a part of the PIN can also be used as the AIN.

If privacy is not a concern, in one aspect of the present disclosure, the entire identification document number can be used for account identification purposes to reduce the probability of mismatches. Because there are many different countries, states and governments that may issue identification documents, such as driver licenses, passports, etc., an identification document number may not be unique. Under such circumstances, a PIN and/or AIN can eliminate such confusion. In another aspect of the present disclosure, the identification document number, the zip code and the PIN and/or AIN can be jointly used to reach the account identification goal.

The above identification document approach can also be used by an automatic checkout stand, an ATM terminal, a kiosk, or other types of device interfaces.

Alternatively, in one aspect of the present disclosure, the CFTS computer system can send account identification information to a personal communication device of the consumer. The personal communication device of the consumer can send such account identification information to the payee's device interface for account identification purposes through optical, acoustic, electronic, magnetic, and/or electro-magnetic mediums.

For security purposes, in one aspect of the present disclosure, a PIN and/or AIN can also be used to protect such transactions. The above approach can also be used by an automatic checkout stand, an ATM terminal, a kiosk, or other types of device interfaces.

In one aspect of the present disclosure, the consumer uploads his/her recent photo into the computer system of the CFTS. Because a person's face is exposed to the public every day and many online social networks may have already posted the photo of the person on the Internet, the photo of a consumer is generally not considered to be "private information." This photo can be used to enhance the security of the CFTS.

In one aspect of the present disclosure, in order to open an account, a consumer may upload his/her name and tax ID so that the CFTS can verify the existence of the consumer through government records. Because each consumer has one unique tax ID in a country, each consumer has only one chance to open an account with the computer of the CFTS. If a duplicate tax ID is detected, the CFTS can conduct an investigation to identify which consumer has the correct tax ID and can filter out the fraudster. The tax ID can be encrypted in the database, or encrypted in a separate database, so that nobody can see or use it after the account opening process.

To comply with anti-money laundering and anti-terrorist financing requirements, in one aspect of the present disclosure, the computer system may screen the consumer against the regulatory lists to ensure that the CFTS can conduct transactions with the consumer in compliance with applicable regulations and laws. In another aspect of the present disclosure, the computer system of CFTS can conduct transactional monitoring to detect suspicious activities in compliance with applicable regulations and laws.

In yet another aspect of the present disclosure, a consumer may provide information about a financial account under the consumer's name. The CFTS can conduct a transaction with the consumer's financial account and request the consumer to report the amount and/or the type of transaction. If the consumer cannot report it correctly, the consumer may be a fraudster because he/she cannot tell what is going on in his/her own financial account. The financial account information can be encrypted so that nobody can see or use it.

To ensure that the personal identification information stored in the CFTS database is up-to-date, in one aspect of the present disclosure, a consumer may update his/her personal identification information in the CFTS database whenever there is a change of the information. For example, when a consumer moves to another state, his/her driver's license and address may be changed and the consumer may update the personal identification information stored inside CFTS's database.

In one aspect of the present disclosure, the CFTS computer system can detect a possible address change if the locations of a consumer's transactions have been substantially changed to a new area. Upon such detection of a possible address change, the computer system can send a message to the consumer and request the consumer to update his/her personal identification information.

In one aspect of the present disclosure, a consumer may provide one or more contact phone numbers and/or email addresses for contact purposes.

In one aspect of the present disclosure, a consumer may input into the CFTS database a list of questions and answers which are designed by the consumer and relate to unique knowledge known only by the consumer. For example, a question may be "What is the name of a person who sat next to me during $1^{st}$ grade?" The answer to this question will be similarly unique. Because the questions are designed by the consumer, the chance for a fraudster to know the answers is substantially negligible. For the purposes of this disclosure, these questions are referred to as "challenge questions."

In another aspect of the present disclosure, the challenge question may be "What is the key code?", and a consumer is required to input a key code into the device interface of the CFTS computer. For the purposes of this disclosure, a key code is an alpha-numeric combination designed by the consumer, substantially like a password. The chance for another person to know or correctly guess the key code is low.

To further strengthen the protection of the consumer, in yet another aspect of the present disclosure, the CFTS may use each key code only once during a pre-defined period of time. The consumer may update the key code periodically. Alternatively, the consumer can store multiple key codes at one time to avoid the burden of frequently updating the key codes.

To provide additional protection to the consumer, in one aspect of the present disclosure, a consumer can select his/her own user ID, Personal Identification Number, AIN, password, etc. In another aspect of the present disclosure, a consumer can change his/her user ID, Personal Identification Number, AIN, password, etc. from time to time as an extra protection against theft of these data used by the CFTS.

Because each user of the CFTS registers with the computer system of CFTS and uses the CFTS services based on a unique identity, the CFTS can conduct financial transactions for the user. There are many ways to transfer funds electronically between an entity's (e.g., payer's) account in a financial institution and the entity's account in the CFTS. For example, in one aspect of the present disclosure, an Automatic Clearing House ("ACH") transaction can complete such an electronic fund transfer at a very low cost today.

In other aspects of the present disclosure, debit card networks, credit card networks, ATM or other real time and non-real time networks can be used to transfer funds electronically between an entity's account in a financial institution and the entity's account in the CFTS.

As a result, any consumer, organization, merchant or financial institution can transfer funds to another consumer, organization, merchant or financial institution through the CFTS. The CFTS can become a common platform for consumers, businesses and financial institutions to conduct commercial activities.

After the consumer has opened an account with the computer of the CFTS, if a fraudster tries to use the consumer's stolen identity to conduct a financial transaction at a bank, in one aspect of the present disclosure, a teller can enter into the computer system of the CFTS a subset of partial personal identification information used by the CFTS. The computer system of the CFTS can search its database to find and display the photo of the consumer.

Alternatively, in another aspect of the present disclosure, the teller can scan an official identification document of the fraudster instead of manually entering the subset of partial personal identification information into the computer system of CFTS. The computer system of CFTS can search its database to find and display the photo of the consumer. The teller can deny the fraudster's transactions if he/she does not correspond to the photo of the consumer.

If the teller cannot distinguish the fraudster based on the photo of the consumer, in another aspect of the present disclosure, the teller can ask a challenge question or request a key code designed by the consumer. If the person cannot answer the challenge question or give the key code correctly, this person is possibly a fraudster.

In another aspect of the present disclosure, the teller can request the person to provide an additional piece of partial personal information. The computer system of the CFTS can compare the additional piece of information of the person with the consumer's information stored in the CFTS database to determine whether the person is the consumer.

In yet another aspect of the present disclosure, authorized personnel of a financial institution can call the consumer's phone number, which was provided by the consumer and stored in the CFTS database, to verify whether the consumer is the same person conducting the transactions at the financial institution. In an alternative aspect of the present disclosure, authorized personnel of a financial institution can send an email to the consumer to verify whether the consumer has requested the financial institution to conduct a particular transaction.

In one aspect of the present disclosure, the teller can inform the CFTS computer if the teller rejects the transaction and the CFTS computer can send an alert information message to the consumer so that the consumer is alerted of a possible fraud against the consumer. Similarly, if a fraudster tries to use the consumer's identity to purchase goods or services at a merchant after stealing the consumer's identity, in other aspects of the present disclosure, the photo of the consumer, the challenge questions, the key codes, and/or the additional partial information can be used to detect the fraudster.

In another aspect of the present disclosure, the merchant informs the CFTS computer if the merchant rejects the transaction and the CFTS computer can send a message to the consumer so that the consumer may be alerted that there is a possible fraud against the consumer.

If a fraudster tries to use the consumer's identity to purchase goods or services online, in another aspect of the present disclosure, the challenge questions, the key codes and/or the additional partial personal information can be used by the online merchants to detect the fraudster.

In yet another aspect of the present disclosure, if the CFTS computer rejects the transaction because the answer is wrong, the CFTS computer can also send a message to the consumer so that the consumer is alerted of a possible fraud against the consumer.

In one aspect of the present disclosure, the CFTS can alert the consumer's financial institutions after identifying a possible identity theft and/or fraud against the consumer so that the financial institutions can act to protect the consumer and the financial institutions.

In another aspect of the present disclosure, a computer system can use the alert provided by the CFTS computer to implement additional provisions to protect the consumer, the financial institutions and possibly other clients of the financial institutions. An additional software system can be established in the computers of the financial institutions for anti-fraud purposes based on the alert provided by the CFTS computer.

As a result, the CFTS also enables consumers, financial institutions and merchants to jointly detect and prevent fraud in financial transactions.

To further automate the process of financial crime prevention, in one aspect of the present disclosure, the transaction networks of financial institutions, such as the credit card network, debit card network, trading network, insurance network, etc. can be linked to the CFTS computer so that a consumer's photo, challenge questions, key codes, and/or additional information can be used by consumers, merchants or financial institutions when they conduct transactions through these transaction networks.

In another aspect of the present invention, the CFTS can be integrated into the existing networks for credit cards, debit cards, stored value cards, ATM cards, gift cards, prepaid cards, etc.

To facilitate anti-fraud payment transactions for a consumer, in one aspect of the present disclosure, a consumer (e.g., the payer) can give the merchant (i.e., the payee) the payer's CFTS account identification (which consists of AIN and a set of partial personal identification data), the payer's official identification document, or the account identification information transmitted from the personal communication device through, for example, a bar code, electronic signal, acoustic, magnetic signal, electro-magnetic signal, etc. The payee can then enter the account identification or the official identification document number into the device interface provided by the CFTS computer over the network. Alternatively, the official identification document number, bar code, acoustic, electronic signal, magnetic signal, or electro-magnetic signal can be read by a device interface the PIN or AIN can also be used as an option.

In addition, the payee or payer can enter a dollar amount the payer is supposed to pay. If there is a sufficient amount of money in the payer's CFTS account to cover the payment amount, the CFTS computer can freeze the amount of money in the payer's account and issue a new "pass code" which value cannot be predicted before the issuing. In one aspect of the present disclosure, the pass code, the dollar amount, and/or the payee's name are sent to the payer by a text message, voice mail, instant message, etc. through a mobile phone, Personal Digital Assistant (PDA), or other personal communication devices. In another aspect of the present disclosure, the pass code, the dollar amount, and/or the payee's name are sent to the payer by email, land line phone, or fax.

After receiving the pass code and confirming the dollar amount and the payee's name, in one aspect of the present disclosure, the payer may give the pass code to payee who can enter the pass code into the device interface of the CFTS computer. If the pass code entered by the payee matches the pass code sent to the payer, the CFTS computer can transfer the frozen amount of money in the payer's account into the payee's account and the payment transaction is completed. Alternatively, the payer can enter the pass code into the payee's device interface for a point of sale transaction, or enter the pass code into payee's computer user interface for an online transaction or a transaction at an automatic checkout stand. In another aspect of the present disclosure, after receiving the pass code, a payer can send a text message, instant message, email, fax, voice mail, etc. to the computer of the CFTS to approve a particular transaction based on the particular pass code associated with the transaction.

The financial transactions referred to in the present disclosure are not limited to payment transactions. The same system and method can be used for other types of financial instructions. For example, in another aspect of the present disclosure, a consumer (e.g., a stock trader) can give a stockbroker (i.e., the counter party) the stock trader's CFTS account identification, the stock trader's identification document, or an optical, acoustic electronic, electro-magnetic or magnetic signal from the trader's personal communication device. The stockbroker can then input the account identification, the identification document number, or receive an optical, acoustic, electronic, electro-magnetic or magnetic signal through the device interface of the CFTS computer. In addition, the stockbroker can enter the transactional details given by the stock trader. If the stock trader's account meets the trading requirements for this particular transaction, the CFTS computer can freeze the amount of money involved in the stock trader's account to cover the transaction cost and issue a new "pass code" which value cannot be predicted before the issuing.

In one aspect of the present disclosure, the pass code, the transaction details and/or the stockbroker's name are sent to the stock trader by a text message, instant message, voice mail, etc. through a cellular phone, Personal Digital Assistant (PDA), or other personal communication devices. In another aspect of the present disclosure, the pass code, the transaction details and/or the stockbroker's name are sent to the stock trader by email, land line phone, fax, etc.

After receiving the pass code and confirming the transactional details and the stockbroker's name, in one aspect of the present disclosure, the stock trader may give the pass code to the stockbroker who can enter the pass code into the device interface of the CFTS computer. If the pass code entered by the stockbroker matches the pass code sent to the stock trader, the CFTS computer can complete the transaction based on the instructions given by the stock trader.

Alternatively, the stock trader can enter the pass code into stockbroker's device interface for a point of sale transaction, or enter the pass code into stockbroker's user interface for an online transaction. In another aspect of the present disclosure, after receiving the pass code, a stock trader can send a text message, instant message, email, fax, voice mail, etc. to the computer of CFTS to approve a particular transaction based on the particular pass code associated with the transaction. In addition to stock trading transactions, other financial transactions can be conducted in a similar manner through the CFTS computer.

In one aspect of the present disclosure, the CFTS computer can change the consumer's (or payer's) AIN or PIN at the request of the consumer (or payer).

In another aspect of the present disclosure, the pass code is given a fixed amount of life time. If the correct pass code is not entered into the device interface of the CFTS computer within that fixed amount of time, the pass code can expire, the transaction can be automatically canceled and the frozen amount of money in the consumer's account can be released back to the consumer.

To further protect the consumer, in one aspect of the present disclosure, if a pre-defined number of wrong pass codes have been entered against a consumer's account, the consumer's account can be frozen because somebody may be trying to commit fraud against the consumer through trial-and-error. The frozen account can be reset (i.e., unfrozen) to normal condition by the consumer. The consumer can also request the CFTS computer to change its account identification or AIN before resetting the account status back to normal condition.

In one aspect of the present disclosure, if the dollar amount of a single transaction has exceeded a threshold set by the consumer, the consumer's account can be frozen until the consumer resets the account back to normal condition. In another aspect of the present disclosure, if the aggregate amount of transactions of a consumer's account during a pre-defined period of time has exceeded a threshold set by the consumer, the consumer's account can be frozen. This frozen account can be reset to normal condition by the consumer. In yet another aspect of the present disclosure, if the total number of transactions in a consumer's account during a pre-defined period of time has exceeded the threshold set by the consumer, the consumer's account can be frozen. The consumer can reset or unfreeze the account.

The consumer can log into the CFTS computer to reset the consumer's account. Alternatively, the counter party (or payee) or consumer can enter an authorization code which is only known to the consumer to reset the account.

Because the pass code is newly generated by the computer of CFTS in each transaction, the counter party of the transaction cannot steal money from the consumer because the counter party does not know what the pass code is in each transaction until the consumer has confirmed the dollar amount and provided the pass code to the counter party. Because the pass code is sent only to the consumer, a third party is prevented from stealing money from the consumer because the third party does not receive the pass code to complete the transaction. Consequently, even if the counter party or a third party has stolen the CFTS account identification, the identification document or the optical, acoustic, electronic, electro-magnetic, or magnetic signal of the consumer, the counter party or the third party cannot commit fraud against the consumer.

Because the amount of payment is verified and frozen in the consumer's account first before the pass code is generated and sent to the consumer, the consumer cannot default on the payment.

Consequently, the CFTS is useful for all kind of financial transactions, including point-of-sale transactions when two parties meet face-to-face, online transactions and remote transactions when the counter parties (or payees) cannot verify who the consumers (or payers) are.

In one aspect of the present disclosure, when a payer places an order on the Internet, the payer can enter the payer's CFTS account identification, which consists of the AIN and a set of partial personal identification data, into the user interface of the Internet merchant. This CFTS account identification is resent by the Internet merchant to the CFTS computer which can send a pass code to the payer. Then, the payer can enter the pass code into the user interface of the Internet merchant. This pass code is resent by the Internet merchant to the CFTS computer to transfer the payment from the payer's CFTS account to the payee's CFTS account and the transaction is completed.

In an alternative aspect of the present disclosure, after receiving the pass code, a payer can send a text message, instant message, email, fax, voice mail, etc. to the computer of CFTS to approve a particular transaction based on the particular pass code associated with the transaction. As a result, the payer can securely complete the online transaction without releasing any personal identification information, suppressing the possibility of fraud, and protecting both the payer and the payee.

In another aspect of the present disclosure, a payer can order goods or services remotely through a phone call by giving the payee the payer's CFTS account identification. After the payee enters the payer's CFTS account identification into a device interface of the CFTS, the CFTS computer sends a pass code to the payer. The payer provides the payee with the pass code to complete the transaction. As a result of the present disclosure, the payee can complete the transaction without the need to know the payer's identity and both parties are fully protected in the transaction.

In another aspect of the present disclosure, a payer can complete the payment transaction by himself at an automatic checkout stand. The payer can enter his CFTS account identification into the checkout stand, which can resend the payer's CFTS account identification to the CFTS computer. Alternatively, the payer's official identification document or the optical, acoustic, electronic, electro-magnetic or magnetic signal transmitted by the payer's personal communication device can be read by the checkout stand. The PIN can also be used as an option. The CFTS computer can send the pass code to the payer, for example, by text message, instant message, voice mail, email, etc. to the payer's PDA, mobile phone, etc. Then, the payer can enter into the checkout stand the pass code. The pass code will be sent to the CFTS computer to transfer the payment from the payer's account to the payee's account and the transaction is completed.

In an alternative aspect of the present disclosure, after receiving the pass code, the payer can send a text message, instant message, voice mail, email, fax, etc. to the CFTS computer to approve a particular transaction based on the particular pass code associated with that transaction. Both payer and payee are fully protected against fraud in this transaction and the payer's identity is not disclosed.

Similarly, the CFTS account identification, the consumer's personal identification document and/or the optical, acoustic, electronic, electro-magnetic or magnetic signal transmitted by the payer's personal communication device can be used at an ATM, kiosk, or other types of device interfaces. A new pass code will be sent to the consumer's personal communication device after the consumer's CFTS account has been identified through the CFTS account identification, the consumer's personal identification document and/or the optical, electronic, acoustic, electro-magnetic or magnetic signal transmitted by the payer's personal communication device. The consumer can enter the pass code into the ATM, kiosk, or the other types of device interface. If the pass code is correct, the consumer can proceed to conduct financial transactions through the ATM, kiosk or the other types of device interfaces.

The present disclosure can also be used to protect the CFTS account user ID, password and/or PIN against theft. Traditionally, a security token device is used to protect login security. Such an approach is generally expensive because hashing, synchronization, digital signature, cryptography and/or other complicated technology are required to produce a token. In addition, the token device itself costs money. Furthermore, a fraudster can still steal the token device from a user.

In one aspect of the present disclosure, after a user (e.g., a consumer, merchant, or financial institution) has correctly entered the user ID, password and/or PIN when the user tries to login from a source application, a new pass code is generated by the system. Because no hashing, synchronization, digital signature, cryptography or other complicated technology is required to generate a pass code, the CFTS computer system can easily produce such a pass code at very low cost.

This pass code is immediately sent to a destination other than the source application from which the user is attempting login. For example, the destination can be an email address, phone number, etc. based on the contact information of the officially registered user stored inside the system. The user has to enter the correct pass code into the system to complete the login process before the pass code expires. As a result, even if a fraudster has stolen the user ID, password and/or PIN, the fraudster cannot log into the system without having the important pass code. Because the pass code is different in each login, a third party is unable to steal such a pass code.

There is no need to purchase any token device which can become very expensive. The login process of the present disclosure can be quickly implemented as long as the user has some communication device, such as a mobile phone which is very popular today.

Therefore, one aspect of the present disclosure provides an enhanced protection to computer-based systems against financial transactions fraud.

The system of one aspect of the present disclosure can potentially replace all the traditional payment instruments and, at the same time, provide improved protection for consumers, organizations, merchants and financial institutions. Furthermore, there is no need for consumers to carry the traditional financial instruments such as cash, check, credit card, debit card, prepaid card, gift card, stored-value card, ATM card, monetary instruments, etc.

Moreover, the present disclosure can quickly and securely transfer money to any place with access to the CFTS. The CFTS becomes a Global Remittance Network.

As an additional convenience to the consumer, in one aspect of the present disclosure, a consumer can go shopping without carrying the traditional financial instruments such as cash, credit card, debit card, prepaid card, stored-value card, gift card, check, monetary instrument, etc. For example, the merchant can enter the dollar amount and the consumer's CFTS account identification into the device interface of the CFTS. The consumer can obtain the pass code from his/her personal communication device and give it to the merchant to complete the transaction. This option is very useful to protect young children whose parents do not feel comfortable letting children carry cash or pre-paid cards for safety reasons.

In fact, a consumer can easily conduct any payment as long as he/she carries a personal communication device such as mobile phone, smartphone, Smartbook, PDA, etc. As a result, in the event that a consumer forgets his/her wallet containing financial instruments (e.g., cash, credit/debit/gift cards, etc.), he/she could still pay the merchant through his/her CFTS account. If the consumer also forgets to carry the cellular phone, PDA, etc., he/she can still use the merchant's computer to log into the CFTS to directly transfer funds from the consumer's CFTS account to the merchant's CFTS account.

In summary, many different aspects and combinations of aspects are disclosed in the present invention to protect a financial transaction against fraud. A particular aspect or a particular combination of aspects can be applied for a financial transaction based on the risk involved in the financial transaction. Alternatively, the choice of a particular aspect or a particular combination of aspects can be made based on commercial reasons.

As contemplated in the described aspects, one of many possible combinations is described below as an example. The computer system of the Cardless Financial Transactions Network ("CFTS") 500 and a network, such as the Internet 600 enable a consumer 100, a financial institution 200, a retail store 300 and an online merchant 400 to conduct secured financial transactions as shown in FIG. 1.

Figure 2:
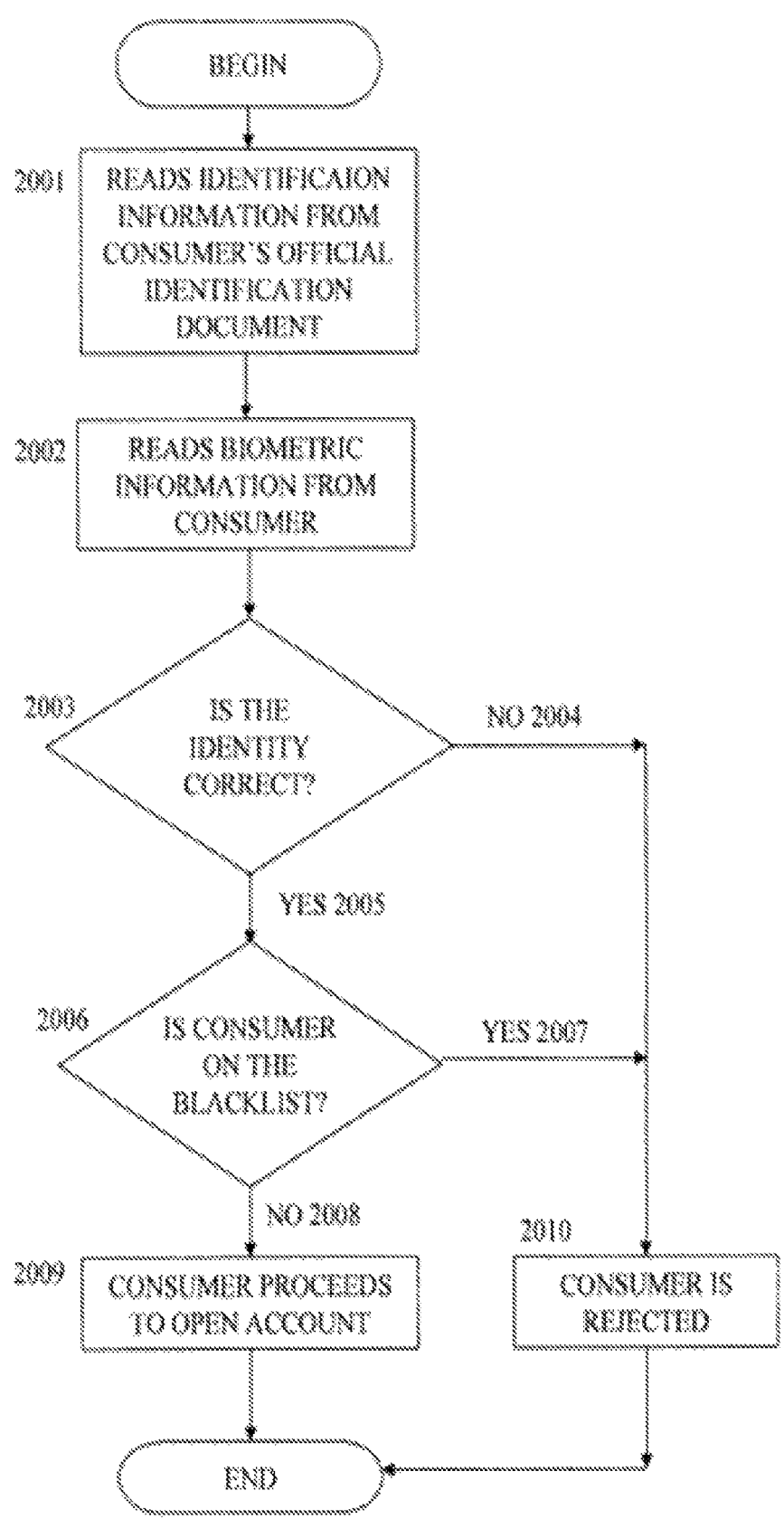
FIG. 2 is a flowchart of an example process, indicating how a consumer registers with the computer system of CFTS as shown in FIG. 1.

Reference should now be made to the flowchart of FIG. 2 in combination with the system diagram of FIG. 1, which together illustrate how a consumer can open an account with the computer system of CFTS 500.

First (block 2001), a device interface reads the embedded information from consumer's official identification document. The device interface authenticates the identity of the consumer 100 by comparing the embedded identification information with the information provided by the consumer 100 (block 2002). For example, if the fingerprint of the consumers 100 matches the biometric information embedded within the official identification document, the consumer 100 must be the owner of the official identification document.

According to the authentication result, the device interface may take a different action (decision block 2003). If the consumer's identity is not correct (No branch 2004), i.e., the identity of the consumer 100 cannot be authenticated, the device interface rejects the consumer 100 from opening an account (block 2010).

If the consumer's identity is correct (YES branch 2005), i.e., the consumer 100 is the owner of the official identification document, the CFTS computer 500 will determine whether the consumer 100 is on the blacklist used by the CFTS computer 500 (decision block 2006). This blacklist includes the information provided by government agencies (e.g., Office of Foreign Assets Control) and commercial organizations.

If the consumer 100 is on the blacklist (YES branch 2007), the consumer is rejected from opening an account (block 2010). If the consumer 100 is not on the black list (NO branch 2008), the consumer is permitted to proceed to complete the process and open an account with the CFTS computer 500 (block 2009).

Figure 3A:
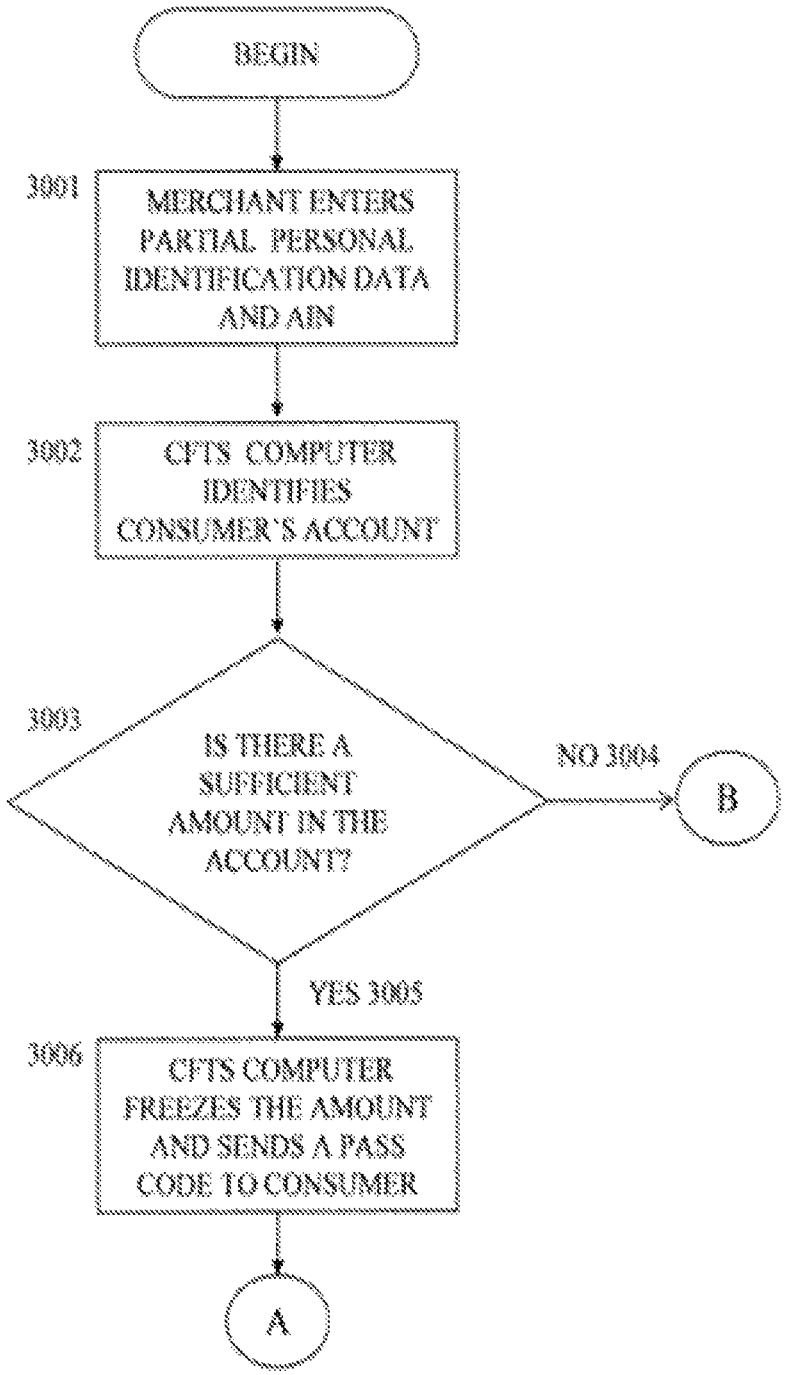

After the consumer 100 has opened an account with the CFTS computer 500, the consumer 100 can conduct secured financial transactions with a retail store 300 at point of sale or with a remote merchant 400 via phone call. The flowchart in FIGS. 3A and 3B in combination with the system diagram of FIG. 1 illustrate how these kinds of transactions can be conducted.

The consumer 100 provides the retail store 300 or the remote merchant 400 with a set of partial personal identification data, e.g., the last 4 digits of the driver's license number and the 5-digit zip code. In addition, the consumer 100 provides the retail store 300 or the merchant 400 with his/her CFTS account identification number (AIN). The retail store 300 or the merchant 400 enters the partial personal identification and AIN of the consumer 100 into a device interface of the CFTS (block 3001).

The set of partial personal identification data and the AIN of the consumer 100 are sent to the CFTS computer 500 via network 600. The CFTS computer 500 uses the received information to identify the account of the consumer 100 (block 3002).

The CFTS computer 500 determines whether there is a sufficient amount of money in the consumer's account for the transaction (decision block 3003). If there is not a sufficient amount of money (NO branch 3004), the CFTS computer 500 rejects the transaction (block 3012). If there is a sufficient amount of money (YES branch 3005), the CFTS computer 500 freezes the amount for the transaction and sends a new pass code to the consumer 100 (block 3006).

The consumer 100 gives the pass code to the retail store 300 or the merchant 400, which enters the pass code into the device interface of the CFTS (block 3007). The CFTS computer 500 determines whether the received pass code is the same pass code sent to the consumer 100 (decision block 3008).

If the pass code is incorrect (NO branch 3009), the CFTS computer 500 rejects the transaction (block 3012). If the pass code is correct (YES branch 3010), i.e., the same pass code is received, the CFTS computer 500 completes the transaction for the consumer 100 (block 3011).

Figure 4A:
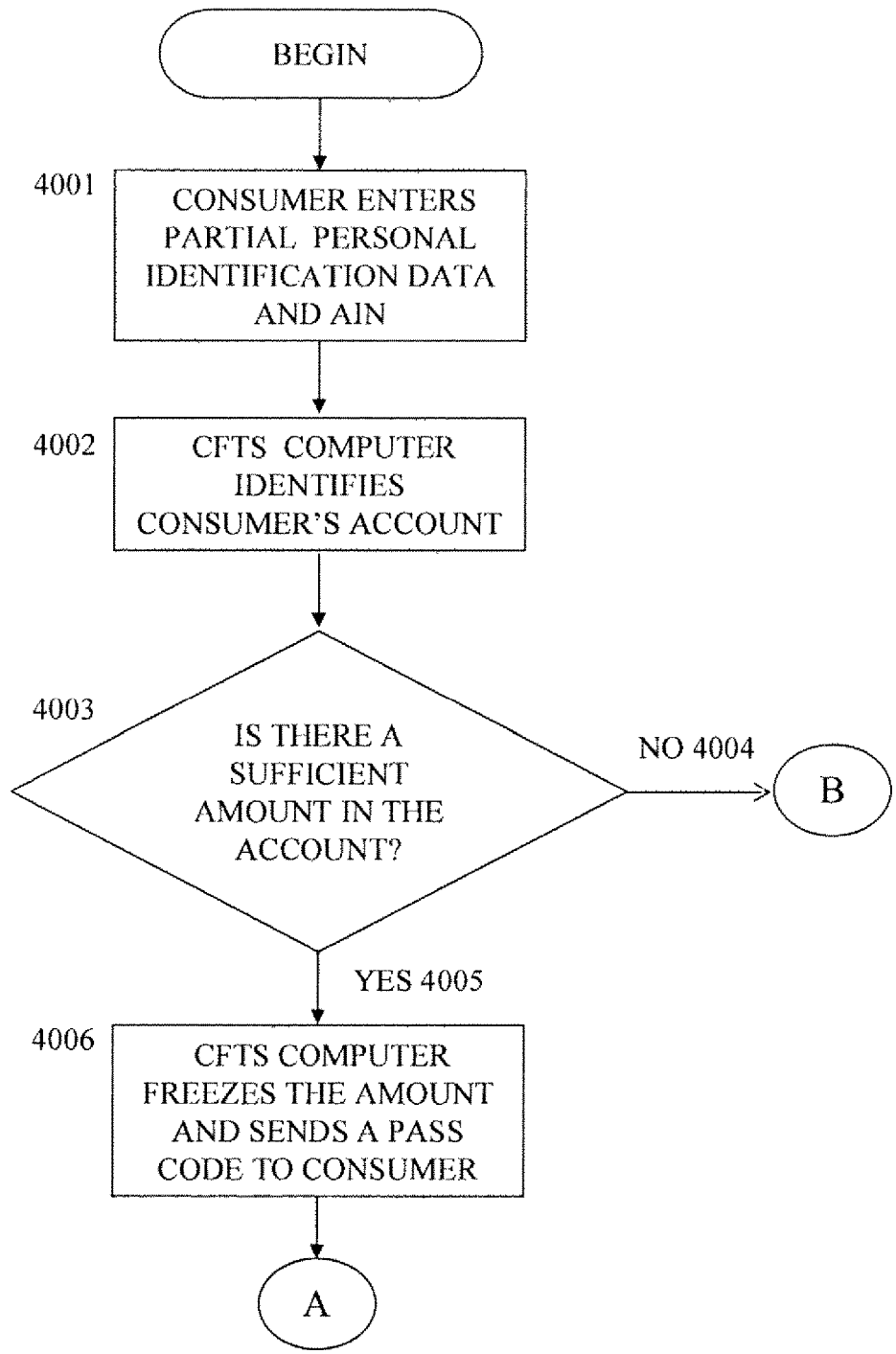

Sometimes, retail store 300 may permit consumer 100 to interact directly with the device interface in the retail store 300. In addition, an automatic checkout stand may expect the consumer 100 to interface directly with the checkout stand. Furthermore, for online commercial activities, a consumer 100 may interact directly with the user interface provided by the online merchant 400 via the network 600. Under such circumstances, the flowchart in FIGS. 4A and 4B in combination with the system diagram of FIG. 1 illustrate how these transactions can be conducted on the CFTS.

The consumer 100 enters a set of partial personal identification data, e.g., the last 4 digits of the driver's license number and the 5-digit zip code, and AIN into a device interface which sends the entered data to the CFTS computer 500 via network 600 (block 4001). The CFTS computer 500 uses the received information to identify the account of the consumer 100 (block 4002).

The CFTS computer 500 determines whether there is a sufficient amount of money in the consumer's account for the transaction (decision block 4003). If there is not a sufficient amount of money (NO branch 4004), the CFTS computer 500 rejects the transaction (block 4012). If there is a sufficient amount of money (YES branch 4005), the CFTS computer 500 freezes the amount for the transaction and sends a new pass code to the consumer 100 (block 4006).

The consumer 100 enters the pass code into the device interface which sends the pass code to the CFTS computer 500 (block 4007). The CFTS computer 500 determines whether the received pass code is the same pass code sent to the consumer 100 (decision block 4008). If the pass code is incorrect (NO branch 4009), the CFTS computer 500 rejects the transaction (block 4012). If the pass code is correct (YES branch 4010), i.e., the same pass code is received, the CFTS computer 500 completes the transaction for the consumer 100 (block 4011).

Figure 5A:
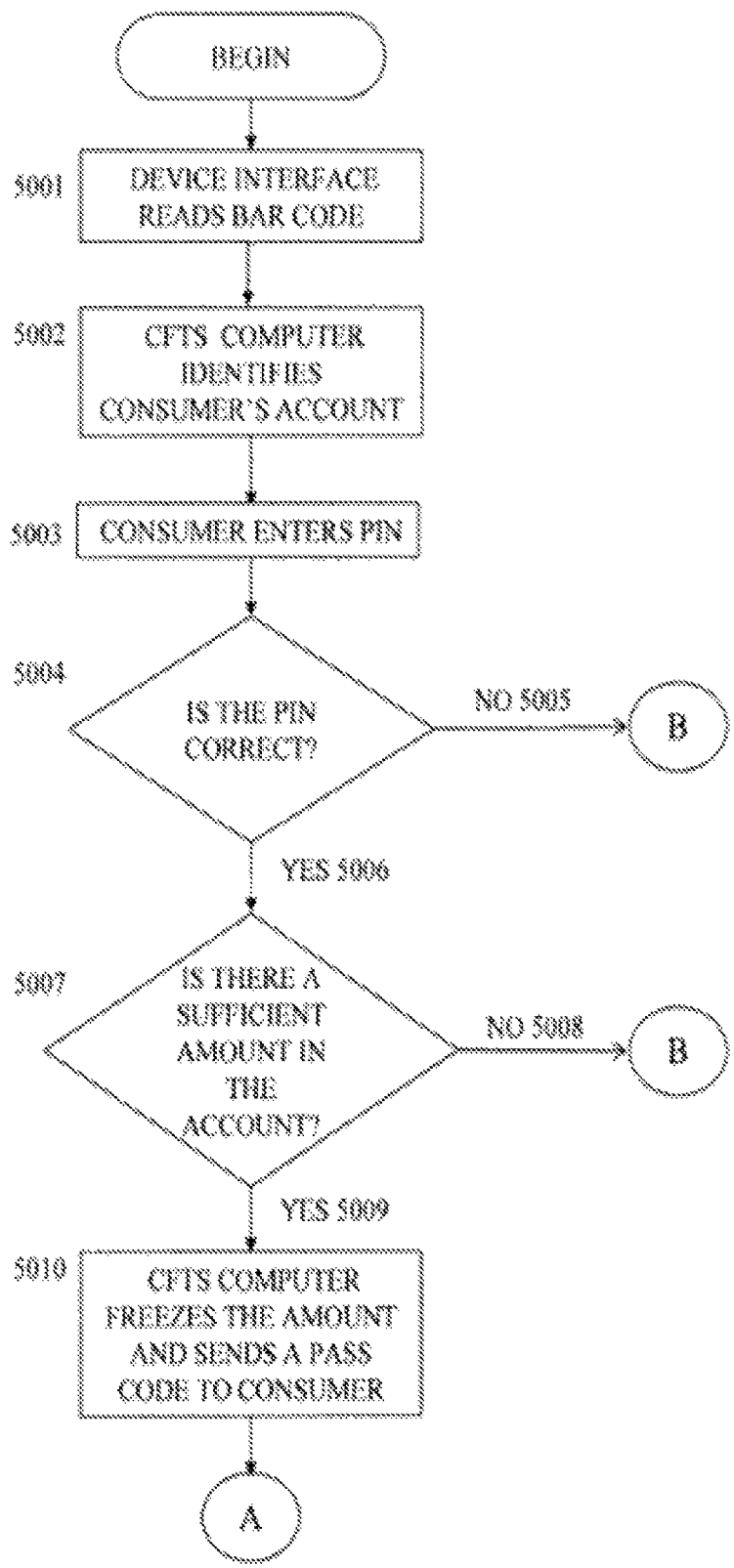

Alternatively, a consumer 100 can use the bar code sent by the CFTS computer 500 to his/her personal communication device to complete a secured financial transaction. The flowchart in FIGS. 5A and 5B in combination with the system diagram of FIG. 1 illustrate how this kind of transaction is conducted on CFTS.

A device interface at the retail store 300 reads the bar code from the personal communication device of the consumer 100 (block 5001) and sends the bar code data to the CFTS computer 500 via network 600. The CFTS computer 500 uses the bar code to identify consumer's account (block 5002).

The consumer enters his/her personal identification number (PIN) into the device interface which sends the PIN to the CFTS computer 500 via network 600 (block 5003).

The CFTS computer determines whether the PIN entered by the consumer 100 is correct or not (block 5004). If the PIN is incorrect (NO branch 5005), the CFTS computer 500 rejects the transaction (block 5016). If the PIN is correct (YES branch 5006), the CFTS computer 500 determines whether there is a sufficient amount of money in the consumer's account for the transaction (decision block 5007). If there is not a sufficient amount of money (NO branch 5008), the CFTS computer 500 rejects the transaction (block 5016). If there is a sufficient amount of money (YES branch 5009), the CFTS computer 500 freezes the amount for the transaction and sends a new pass code to the consumer 100 (block 5010).

The consumer 100 enters the pass code into the device interface which sends the pass code to the CFTS computer 500 (block 5011).

The CFTS computer 500 determines whether the received pass code is the same pass code sent to the consumer 100 (decision block 5012). If the pass code is incorrect (NO branch 5013), the CFTS computer 500 rejects the transaction (block 5016). If the pass code is correct (YES branch 5014), i.e., the same pass code is received, the CFTS computer 500 completes the transaction for the consumer 100 (block 5015).

Figure 6:
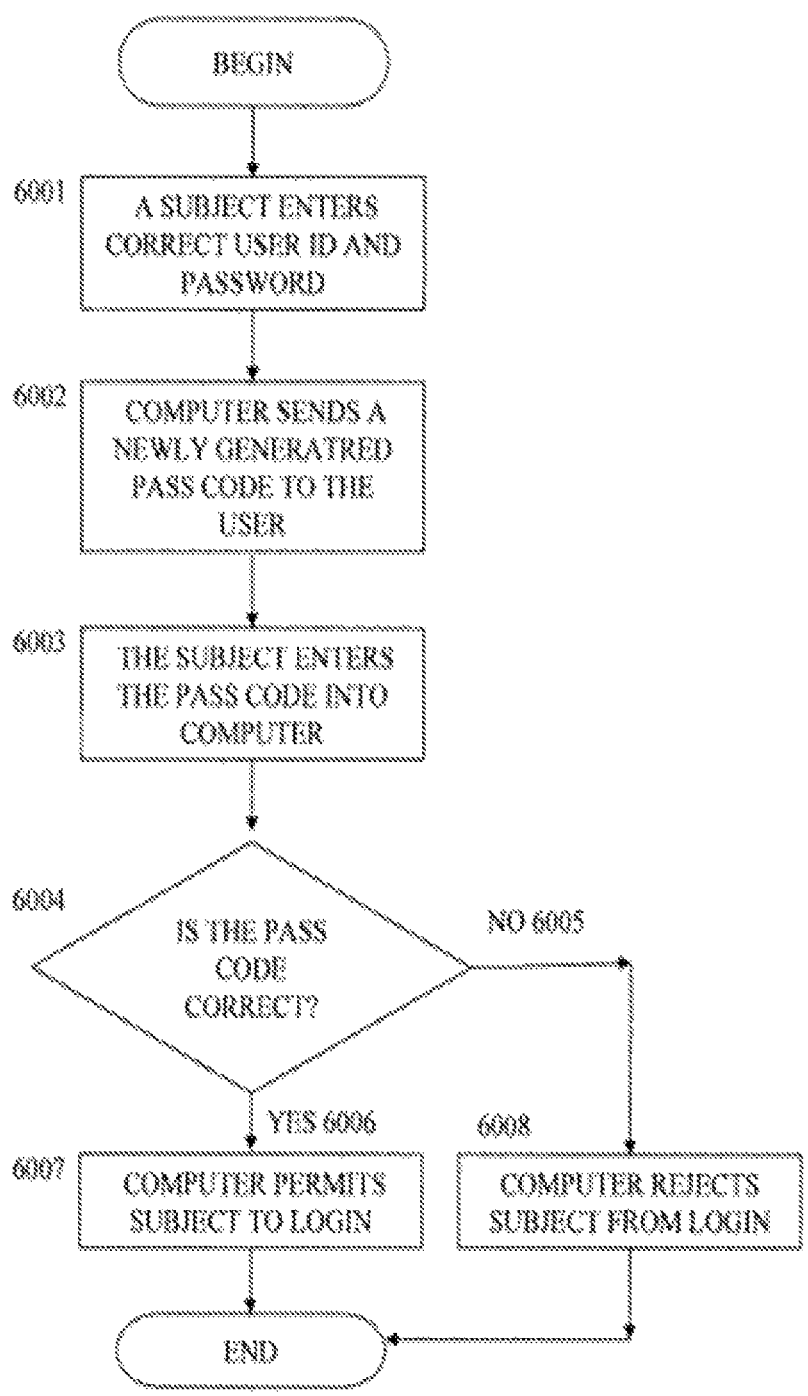
FIG. 6 is a flow chart of an example process, indicating how the system shown in FIG. 1 can ensure that a perpetrator cannot log into the system even if the perpetrator has stolen the correct user ID and/or PIN, and password.

The system and method of the present disclosure can also enhance the login security of a computer system. The flowchart in FIG. 6 illustrates how a fraudster cannot log into a computer system even with a correct User ID and Password.

A subject enters a correct User ID and Password in order to log into a computer system (block 6001). Based on the correct User ID and Password, the computer system sends a new pass code to the registered user (block 6002). The subject is prompted to enter the pass code into the computer system (block 6003).

The computer system determines whether the pass code entered by the subject matches the pass code sent to the registered user (decision block 6004). If the pass code is incorrect (NO branch 6005), the computer system rejects the login by the subject (block 6008). If the pass code is correct (YES branch 6006), the computer system permits the subject to log into the computer system (block 6007).

The system and method of the present disclosure can also be used to conduct financial transactions through a personal identification document. The flowchart in FIGS. 7A and 7B in combination with the system diagram of FIG. 1 illustrate how financial transactions can be completed this way.

A device interface reads the embedded data from a personal identification document of the consumer 100 and sends the embedded data to the CFTS computer 500 (block 7001).

The CFTS computer 500 uses the data received from the device interface to identify the account of the consumer 100 (block 7002).

The CFTS computer 500 determines whether the consumer's account permits the requested transaction (decision block 7003). For example, if the consumer's account is a credit account, the account permits the requested transaction when the account has available credit for the transaction. If the consumer's account is a prepaid account, the account permits the requested transaction when the account has sufficient money for the transaction. If the account does not permit such a transaction (NO branch 7004), the CFTS computer 500 rejects the transaction (block 7012). If the account permits such a transaction (YES branch 7005), the CFTS computer 500 freezes the amount for the transaction and sends a new pass code to the consumer 100 (block 7006).

The consumer 100 gives the pass code to the merchant. The merchant enters the pass code into the device interface which sends the pass code to the CFTS computer 500 (block 7007).

The CFTS computer 500 determines whether the received pass code is the same pass code sent to the consumer 100 (decision block 7008). If the pass code is incorrect (NO branch 7009), the CFTS computer 500 rejects the transaction (block 7012). If the pass code is correct (YES branch 7010), i.e., the same pass code is received, the CFTS computer 500 completes the transaction for the consumer 100 (block 7011).

The methodologies described herein may be implemented by various means depending upon the application. For example, these methodologies may be implemented in hardware, firmware, software, or any combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM, DVD, or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. The communication apparatus may not store all of the instructions and/or data on a computer readable medium.

The aspects described in this disclosure can be assembled to form a variety of applications based on the need. Those skilled in the art and technology to which this disclosure pertains can appreciate that alterations and changes in the described structure may be practiced without meaningfully departing from the principal, spirit and scope of this disclosure. Such alterations and changes should not be construed as deviations from the present disclosure.

What is claimed is:

1. A method of conducting transactions, comprising:
    storing, at a third computer system, a first set of data comprising a portion of a user's identification information, an identity of a user being unidentifiable from the portion of the user's identification information;
    storing, at the third computer system, an identification number of a first computer system associated with the first set of data;
    receiving, at the third computer system from a second computer system, a second set of data;
    sending, from the third computer system to the first computer system based at least in part on the identification number, a new pass code when the first set of data matches the second set of data;
    receiving, at the third computer system, the new pass code from the second computer system; and
    approving, by the third computer system, a transaction associated with the user in response to receiving the new pass code.

2. The method of claim 1, in which the portion of the user's identification information is obtained from an identification document, which comprises at least one of a driver's license, a passport, a government-issued identification document, an alien identification card, a student identification card, a social security card, a tax identification card, a national identification card, a voter identification card, a benefits card, an official identification document, or a combination thereof.

3. The method of claim 1, in which the first computer system comprises at least one of a computer system, a personal communications device, a device interface, or a combination thereof.

4. The method of claim 3, in which the device interface comprises at least one of a keyboard, a keypad, a monitor, a display, a terminal, a computer, a control panel, a vehicle dash board, a network interface, a machinery interface, a video interface, an audio interface, an electronic interface, a magnetic interface, an electromagnetic interface including an electromagnetic wave interface, an optical interface, a light interface, an acoustic interface, a contactless interface, a mobile phone interface, a smartphone interface, a Smartbook interface, a Personal Digital Assistant (PDA) interface, a handheld device interface, a portable device interface, a wireless interface, a wired interface, or a combination thereof.

5. The method of claim 1, in which the second computer system comprises at least one of a computer system, a personal communications device, a device interface, or a combination thereof.

6. The method of claim 5, in which the device interface comprises at least one of a keyboard, a keypad, a monitor, a display, a terminal, a computer, a control panel, a vehicle dash board, a network interface, a machinery interface, a video interface, an audio interface, an electronic interface, a magnetic interface, an electromagnetic interface including an electromagnetic wave interface, an optical interface, a light interface, an acoustic interface, a contactless interface, a mobile phone interface, a smartphone interface, a Smartbook interface, a personal digital assistant (PDA) interface, a handheld device interface, a portable device interface, a wireless interface, a wired interface, or a combination thereof.

7. The method of claim 1, in which the third computer system comprises at least one of a computer system, a personal communications device, a device interface, or a combination thereof.

8. The method of claim 7, in which the device interface comprises a keyboard, a keypad, a monitor, a display, a terminal, a computer, a control panel, a vehicle dash board, a network interface, a machinery interface, a video interface, an audio interface, an electronic interface, a magnetic interface, an electromagnetic interface including an electromagnetic wave interface, an optical interface, a light interface, an acoustic interface, a contactless interface, a mobile phone interface, a smartphone interface, a Smartbook interface, a personal digital assistant (PDA) interface, a handheld device interface, a portable device interface, a wireless interface, a wired interface, or a combination thereof.

9. The method of claim 1, in which the identification number of the first computer system comprises an address, a phone number, or a combination thereof.

10. The method of claim 1, in which the first set of data is associated with at least one of a name, an address, a date of birth, a personal identification number, a user ID, a password, a tax identification number, a type of identification document, an identity number of the identification document, a country, a state, a government organization issuing the identification document, a private organization issuing the identification document, an expiration date of the identification document, a phone number, a screen name, an e-mail address, a photograph, a fingerprint, an iris scan, a physical description, a biometrical information, or a combination thereof.

11. A method of conducting transactions, comprising:
    storing, at a third computer system, a first set of data obtained from a portion of a user's identification information, an identity of a user being unidentifiable from the portion of the user's identification information;
    storing, at the third computer system, an identification number of a first computer system associated with the first set of data;
    receiving, at the third computer system from a second computer system, a second set of data obtained via a device configured to input data;
    sending, from the third computer system to the second computer system, a new pass code when the first set of data matches the second set of data;
    receiving, at the third computer system, the new pass code from the first computer system identified based at least in part on the identification number; and approving, at the third computer system, a transaction associated with the user in response to receiving the new pass code.

12. The method of claim 11, in which the portion of the user's identification information is obtained from an identification document, which comprises at least one of a driver's license, a passport, a government-issued identification document, an alien identification card, a student identification card, a social security card, a tax identification card, a national identification card, a voter identification card, a benefits card, an official identification document, or a combination thereof.

13. The method of claim 11, in which the first computer system comprises at least one of a computer system, a personal communications device, a device interface, or a combination thereof.

14. The method of claim 13, in which the device interface comprises at least one of a keyboard, a keypad, a monitor, a display, a terminal, a computer, a control panel, a vehicle dash board, a network interface, a machinery interface, a video interface, an audio interface, an electronic interface, a magnetic interface, an electromagnetic interface including an electromagnetic wave interface, an optical interface, a light interface, an acoustic interface, a contactless interface, a mobile phone interface, a smartphone interface, a Smartbook interface, a Personal Digital Assistant (PDA) interface, a handheld device interface, a portable device interface, a wireless interface, a wired interface, or a combination thereof.

15. The method of claim 11, in which the second computer system comprises at least one of a computer system, a personal communications device, a device interface, or a combination thereof.

16. The method of claim 15, in which the device interface comprises at least one of a keyboard, a keypad, a monitor, a display, a terminal, a computer, a control panel, a vehicle dash board, a network interface, a machinery interface, a video interface, an audio interface, an electronic interface, a magnetic interface, an electromagnetic interface including an electromagnetic wave interface, an optical interface, a light interface, an acoustic interface, a contactless interface, a mobile phone interface, a smartphone interface, a Smartbook interface, a personal digital assistant (PDA) interface, a handheld device interface, a portable device interface, a wireless interface, a wired interface, or a combination thereof.

17. The method of claim 11, in which the third computer system comprises at least one of a computer system, a personal communications device, a device interface, or a combination thereof.

18. The method of claim 17, in which the device interface comprises a keyboard, a keypad, a monitor, a display, a terminal, a computer, a control panel, a vehicle dash board, a network interface, a machinery interface, a video interface, an audio interface, an electronic interface, a magnetic interface, an electromagnetic interface including an electromagnetic wave interface, an optical interface, a light interface, an acoustic interface, a contactless interface, a mobile phone interface, a smartphone interface, a Smartbook interface, a personal digital assistant (PDA) interface, a handheld device interface, a portable device interface, a wireless interface, a wired interface, or a combination thereof.

19. The method of claim 11, in which the identification number of the first computer system comprises an address, a phone number, or a combination thereof.

20. The method of claim 11, in which the first set of data is associated with at least one of a name, an address, a date of birth, a personal identification number, a user ID, a password, a tax identification number, a type of identification document, an identity number of the identification document, a country, a state, a government organization issuing the identification document, a private organization issuing the identification document, an expiration date of the identification document, a phone number, a screen name, an e-mail address, a photograph, a fingerprint, an iris scan, a physical description, a biometrical information, or a combination thereof.

\* \* \* \* \*